A. J. PODMORE & J. P. CROASDALE.
FLUSHING DEVICE.
APPLICATION FILED MAY 29, 1909.

1,148,253.

Patented July 27, 1915.
2 SHEETS—SHEET 1.

WITNESSES:
Jas. C. Wobensmith
Mae Hofmann

INVENTORS
Arthur J. Podmore
and John P. Croasdale
BY Howard S. Okie
ATTORNEY.

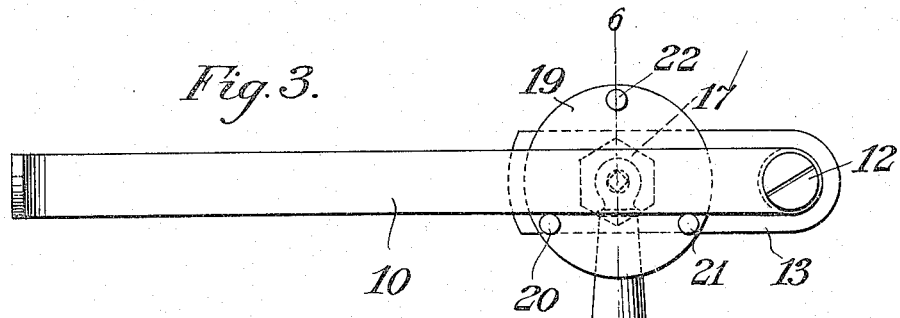
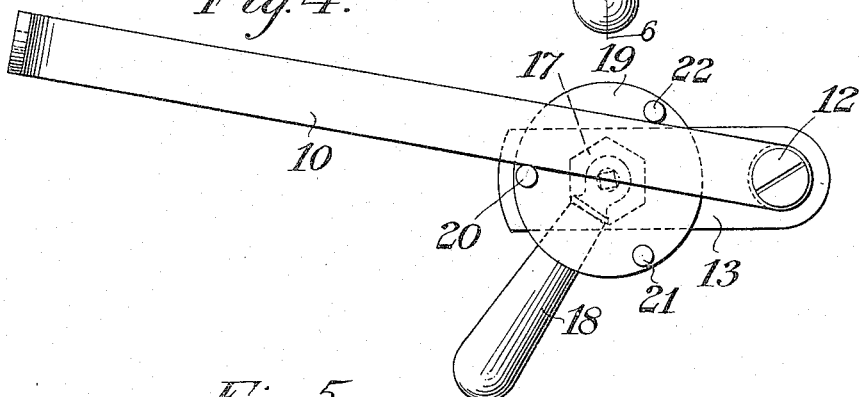
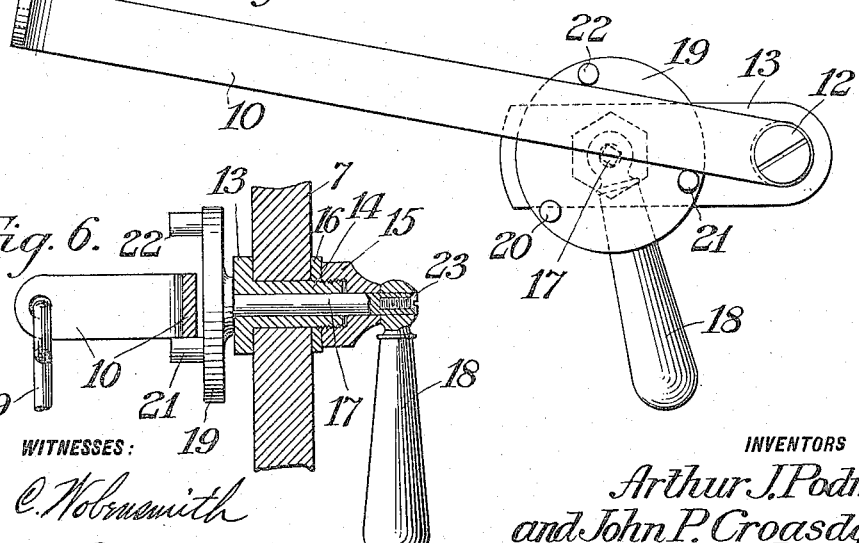
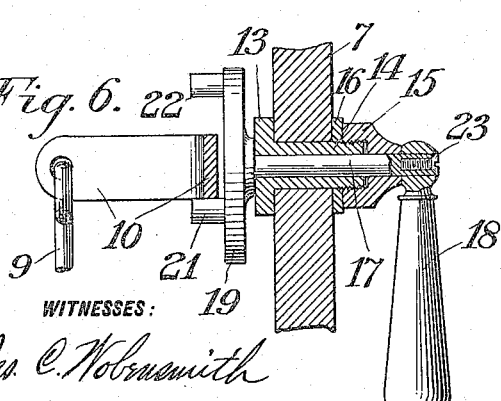

UNITED STATES PATENT OFFICE.

ARTHUR J. PODMORE, OF CAMDEN, NEW JERSEY, AND JOHN P. CROASDALE, OF BERWYN, PENNSYLVANIA, ASSIGNORS TO CAMDEN POTTERY COMPANY, A CORPORATION OF NEW JERSEY.

FLUSHING DEVICE.

1,148,253.      Specification of Letters Patent.      Patented July 27, 1915.

Application filed May 29, 1909. Serial No. 499,113.

*To all whom it may concern:*

Be it known that we, ARTHUR J. PODMORE and JOHN P. CROASDALE, citizens of the United States, residents, respectively, of Camden, Camden county, State of New Jersey, and Berwyn, Chester county, State of Pennsylvania, have invented a new and useful Flushing Device, of which the following is a specification.

Our invention relates to improvements in flushing devices.

Our object is to provide an improved actuating means for the flush valve of a water closet.

The invention is especially applicable to low down flush tanks, where the valve operating handle is located on the tank within convenient reach of the operator.

The invention is also especially convenient for use with porcelain or earthenware tanks.

Figure 1:
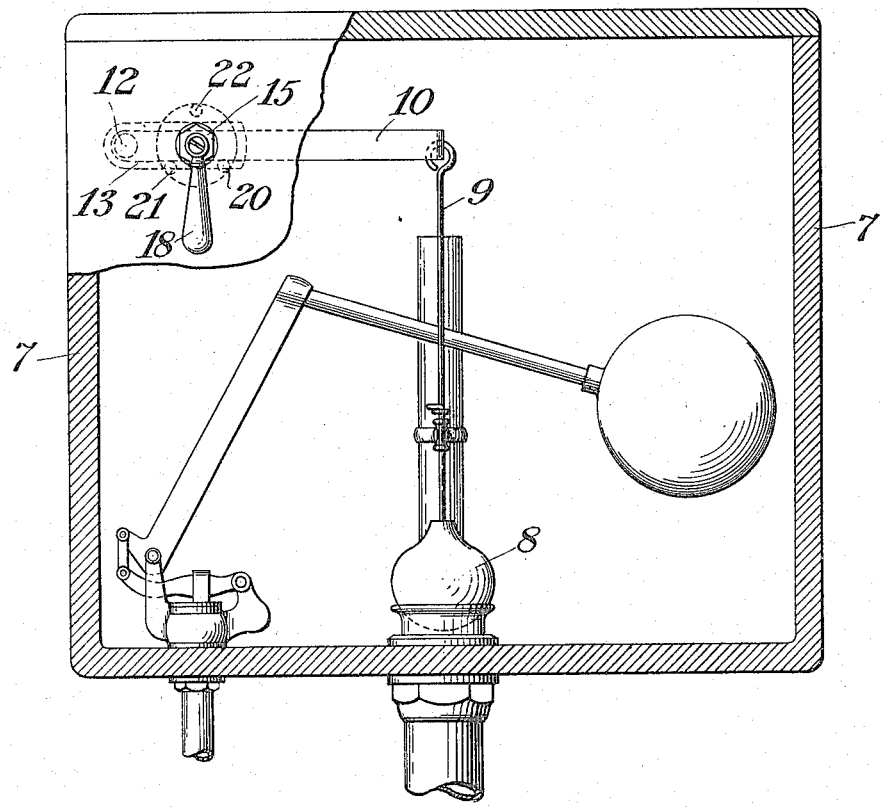
Figure 2:
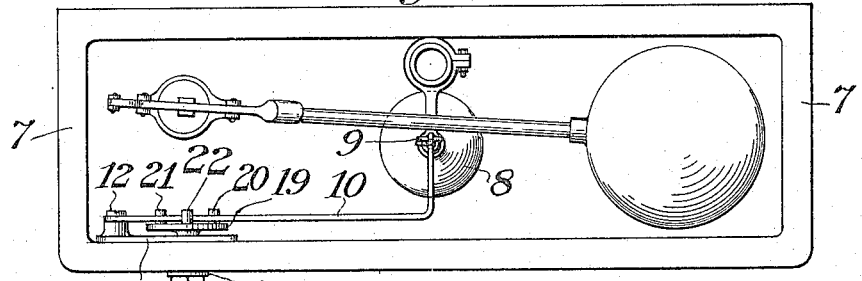

Referring to the drawings:—Figure 1 is a front elevation of the tank, partly in section. Fig. 2 is a plan view, with the tank lid removed. Figs. 3, 4 and 5 are views of the operating handle, lever and associated mechanism, in different positions. Fig. 6 is a section on line 6—6 of Fig. 3.

Similar numerals refer to similar parts throughout the several views.

In Figs. 1 and 2, we show a low down flush tank 7 of the usual type. The flush valve ball 8 is also of the usual type and is connected by the rod 9 to the pivoted lever 10. This lever 10 is pivotally mounted at 12 to the supporting piece or hanger 13. Piece 13 is provided with a lug or bushing 14 which is adapted to project through the aperture in the side of the tank 7. The outer end of lug 14 is threaded to receive the nut 15. By means of which nut 15, and the interposed gasket 16, the member 13 is locked in any desired position. The gasket 16 is provided in connection with a porcelain or earthenware tank to protect the glazed surface from injury by direct contact with the nut 15. The bracket or hanger 13 and lug 14 are apertured to receive the spindle 17; the outer end of which is of square cross-section to receive the operating handle 18, while the inner end of spindle 17 is rigidly connected with the member or disk 19 which is provided with the three lugs or pins 20, 21 and 22. The handle 18 is held upon the end of spindle 17 by the screw 23.

It will thus be noted that the entire actuating mechanism from the handle 18 to the point of lever 10, which is connected with the rod 9, is a self-containing structure supported entirely by the member or hanger 13, lug 14 and nut 15 in a single aperture of the wall of the tank. The structure also permits of a certain limited adjustment of position of pivot 12 about the axis of spindle 17 which adjustment is secured by loosening the nut 15 and moving the bracket member 13 about said axis of 17 until the required position is secured and then tightening nut 15.

The operation of our device is as follows: In the normal position the handle 18 occupies a substantially vertical position as shown in Fig. 3, while the lever 10 occupies a substantially horizontal position in which positions the valve ball 8 is held in the position of closure. By swinging the handle 18 to the left as shown in Fig. 4, pin 20 engages the lever 10 and causes the same to be elevated until the upper side of lever 10 encounters pin 22, which pin 22 limits the upward movement of said lever 10. This raises through the rod 9, the valve ball 8 to cause the opening of the flushing valve. By swinging the handle 18 to the right as shown in Fig. 5, pin 21 encounters the lever 10 and causes the elevation of the same until the upper side of said lever 10 engages pin 22 which limits the upward movement of said lever 10. This likewise causes the opening of the flushing valve. It will thus be seen that by swinging the handle 18 in either direction, either to the right or to the left, the lever 10 is raised a certain height, sufficient to cause the opening of the flush valve, but is prevented from being raised beyond the necessary height. It is also to be noted that the pivot support of the lever 10 is at one extreme end thereof, while the valve connection is at the other extreme end. The pivot also is at the extreme left hand side of the tank, while the flush valve is always substantially in the middle of the tank. This structure permits the use of the maximum length of lever and gives ample space for the lever actuating mechanism, sufficiently removed from the pivot. This feature, and the use of the single supporting body 13, gives ample range for convenient location of the handle, and easy and positive operation of the lever, and consequently of the flushing valve.

What we claim is:—

1. Flush valve operating mechanism comprising a valve-actuating lever, an operating spindle and a member having a limited two-way rotary movement in either direction in response to the actuation of the spindle, said member provided with lever actuating and limiting means operatively engaging with opposite faces of the lever between its fulcrum and its valve connection.

2. In a device of the class described, a flush tank, a lever, a valve operated thereby, a spindle between the valve connection and the fulcrum of the lever and a lever actuating member connected with the spindle and having a limited two-way rotary movement in response to the actuation thereof, said member having a plurality of projections, two of said projections adapted, when said member is stationary, to lie in substantially the same horizontal plane as the lever and to support the same, either one of said projections adapted, when said member is rotated, to actuate the lever to operate the valve, and a projection fixed to said lever actuating member and adapted to limit the upward actuation of the lever.

3. In combination with a water closet flush tank having a spindle rotatively mounted in the wall thereof, a support for the spindle within the tank having an apertured lug extending into the wall of the tank and adapted to receive the spindle, a lever pivotally connected with said support to one side of the spindle, a valve operatively connected with the lever to the other side of the spindle, and a lever actuating member secured to the spindle, having a projection below the horizontal plane of the spindle for actuating the lever and a projection above the horizontal plane of the spindle for limiting the upward actuation of the lever.

4. Flush valve operating mechanism comprising a valve-controlling lever, an operating spindle, a bracket adjustable about the spindle axis and operatively connected with the lever, and spindle-controlled lever-actuating and limiting means comprising a member having a limited two-way rotary movement in either direction in response to the actuation of the spindle, operating upon different faces of the lever between its fulcrum and its valve connection.

ARTHUR J. PODMORE.
JOHN P. CROASDALE.

Witnesses:
MAE HOFMANN,
HOWARD S. OKIE.

Copies of this patent may be obtained for five cents each, by addressing the "Commissioner of Patents, Washington, D. C."